United States Patent
Peitersen et al.

(10) Patent No.: US 12,448,589 B2
(45) Date of Patent: *Oct. 21, 2025

(54) NON-CORROSIVE OVEN DEGREASER CONCENTRATE

(71) Applicant: ECOLAB USA INC., Saint Paul, MN (US)

(72) Inventors: Nathan D. Peitersen, Saint Paul, MN (US); Gregory G. Griese, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 25 days.

This patent is subject to a terminal disclaimer.

(21) Appl. No.: 18/503,355

(22) Filed: Nov. 7, 2023

(65) Prior Publication Data
US 2024/0076577 A1     Mar. 7, 2024

Related U.S. Application Data

(63) Continuation of application No. 17/816,575, filed on Aug. 1, 2022, now Pat. No. 11,845,913, which is a continuation of application No. 15/975,911, filed on May 10, 2018, now Pat. No. 11,434,451, which is a continuation of application No. 14/674,341, filed on Mar. 31, 2015, now Pat. No. 9,994,798, which is a continuation of application No. 13/459,448, filed on Apr. 30, 2012, now Pat. No. 9,023,782.

(60) Provisional application No. 61/488,254, filed on May 20, 2011.

(51) Int. Cl.
| | |
|---|---|
| C11D 3/30 | (2006.01) |
| B08B 9/20 | (2006.01) |
| C11D 1/22 | (2006.01) |
| C11D 3/00 | (2006.01) |
| C11D 3/08 | (2006.01) |
| C11D 3/10 | (2006.01) |
| C11D 3/20 | (2006.01) |
| C11D 3/43 | (2006.01) |

(52) U.S. Cl.
CPC .......... *C11D 3/30* (2013.01); *C11D 1/22* (2013.01); *C11D 3/0057* (2013.01); *C11D 3/0073* (2013.01); *C11D 3/08* (2013.01); *C11D 3/10* (2013.01); *C11D 3/2034* (2013.01); *C11D 3/43* (2013.01); *C11D 2111/14* (2024.01); *C11D 2111/20* (2024.01)

(58) Field of Classification Search
None
See application file for complete search history.

(56) References Cited

U.S. PATENT DOCUMENTS

| | | |
|---|---|---|
| 4,372,788 A | 2/1983 | Lancz |
| 5,080,822 A | 1/1992 | VanEenam |
| 5,080,831 A | 1/1992 | VanEenam |
| 5,158,710 A | 10/1992 | VanEenam |
| 5,540,865 A | 7/1996 | Michael |
| 5,585,341 A | 12/1996 | Van Eenam |
| 5,783,538 A | 7/1998 | Totoki |
| 5,786,319 A | 7/1998 | Pedersen et al. |
| 5,849,682 A | 12/1998 | Van Eenam |
| 5,922,665 A | 7/1999 | Liu |
| 5,977,042 A | 11/1999 | Hernandez et al. |
| 6,423,677 B1 | 7/2002 | Van Eenam |
| 6,544,942 B1 | 4/2003 | Smith |
| 6,723,692 B2 | 4/2004 | Foley et al. |
| 6,784,148 B2 | 8/2004 | Tadrowski et al. |
| 6,916,773 B2 | 7/2005 | Griese et al. |
| 6,929,702 B1 | 8/2005 | Motsenbocker |
| 7,053,037 B2 | 5/2006 | Smith et al. |
| 9,023,782 B2 | 5/2015 | Peitersen et al. |
| 9,994,798 B2 | 6/2018 | Peitersen et al. |
| 11,434,541 B2 | 9/2022 | Peitersen et al. |
| 11,845,913 B2 * | 12/2023 | Peitersen ............. C11D 1/22 |
| 2002/0082185 A1 | 6/2002 | Totoki |
| 2003/0125226 A1 | 7/2003 | Lewis |
| 2004/0067866 A1 | 4/2004 | Griese et al. |
| 2005/0130869 A1 | 6/2005 | Gross et al. |
| 2006/0079435 A1 | 4/2006 | Bigorra Llosas et al. |
| 2006/0112972 A1 | 6/2006 | Peitersen et al. |
| 2006/0113506 A1 | 6/2006 | Man et al. |
| 2006/0234890 A1 | 10/2006 | Griese et al. |
| 2007/0087952 A1 | 4/2007 | Hei et al. |
| 2007/0095003 A1 | 5/2007 | Hei et al. |
| 2008/0230095 A1 | 9/2008 | McKechnie |

(Continued)

FOREIGN PATENT DOCUMENTS

| | | |
|---|---|---|
| CA | 2460146 A1 * | 4/2003 |
| EP | 0379093 | 7/1990 |

(Continued)

OTHER PUBLICATIONS

JP 2004-143251—Kiritani et al.,—English Translation, published May 20, 2004.
Ecolab USA Inc., "European Search Report", Application No. 12790142.9-1357/2710106 PCT/IB2012/052161, date of completion of search is Jul. 10, 2014.
European Patent Office, "Office Action", issued in connection to Application No. 12790142.9-1375, mailed on Jul. 20, 2016, 5 pages. Jul. 20, 2016.

Primary Examiner — Lorna M Douyon
(74) Attorney, Agent, or Firm — McKee, Voorhees & Sease, PLC

(57) ABSTRACT

The invention relates to a non-corrosive degreasing concentrate and ready to use formulation. In particular, non-corrosive compositions capable of removing polymerized grease as effectively as some alkali metal hydroxide (i.e. caustic) based degreasers without requiring the use of personal protective equipment are disclosed.

15 Claims, 1 Drawing Sheet

(56) References Cited

U.S. PATENT DOCUMENTS

| | | |
|---|---|---|
| 2009/0093390 A1 | 4/2009 | Gross et al. |
| 2009/0226541 A1 | 9/2009 | Scholz et al. |
| 2009/0264329 A1 | 10/2009 | Underwood et al. |
| 2010/0010284 A1 | 1/2010 | Proudlock et al. |
| 2010/0305014 A1 | 12/2010 | Miralles et al. |
| 2010/0317559 A1 | 12/2010 | Ryther et al. |
| 2010/0317560 A1 | 12/2010 | Ryther et al. |
| 2010/0327560 A1 | 12/2010 | Silva |
| 2011/0190187 A1 | 8/2011 | Hawes, III et al. |
| 2011/0212866 A1 | 9/2011 | Rao et al. |
| 2012/0148751 A1 | 6/2012 | Herdt et al. |
| 2012/0204916 A1 | 8/2012 | Laser et al. |

FOREIGN PATENT DOCUMENTS

| | | | | |
|---|---|---|---|---|
| GB | 1120470 | | 7/1968 | |
| GB | 2144763 A | * | 3/1985 | ........... C11D 3/2075 |
| JP | 1990289697 | | 11/1990 | |
| JP | 1996012992 | | 1/1996 | |
| JP | 1996165498 | | 6/1996 | |
| JP | 1997059677 | | 3/1997 | |
| JP | 2004143251 A | | 5/2004 | |
| JP | 2004204055 A | | 7/2004 | |
| KR | 1020090114734 A | | 11/2009 | |
| WO | 0190291 A1 | | 11/2001 | |
| WO | 2006115658 A1 | | 11/2006 | |
| WO | 2007002478 A2 | | 1/2007 | |
| WO | 2010073067 A1 | | 7/2010 | |
| WO | 2010138907 A1 | | 12/2010 | |
| WO | 2010146544 A2 | | 12/2010 | |
| WO | 20100136478 | | 12/2010 | |
| WO | 2011146832 A2 | | 11/2011 | |

\* cited by examiner

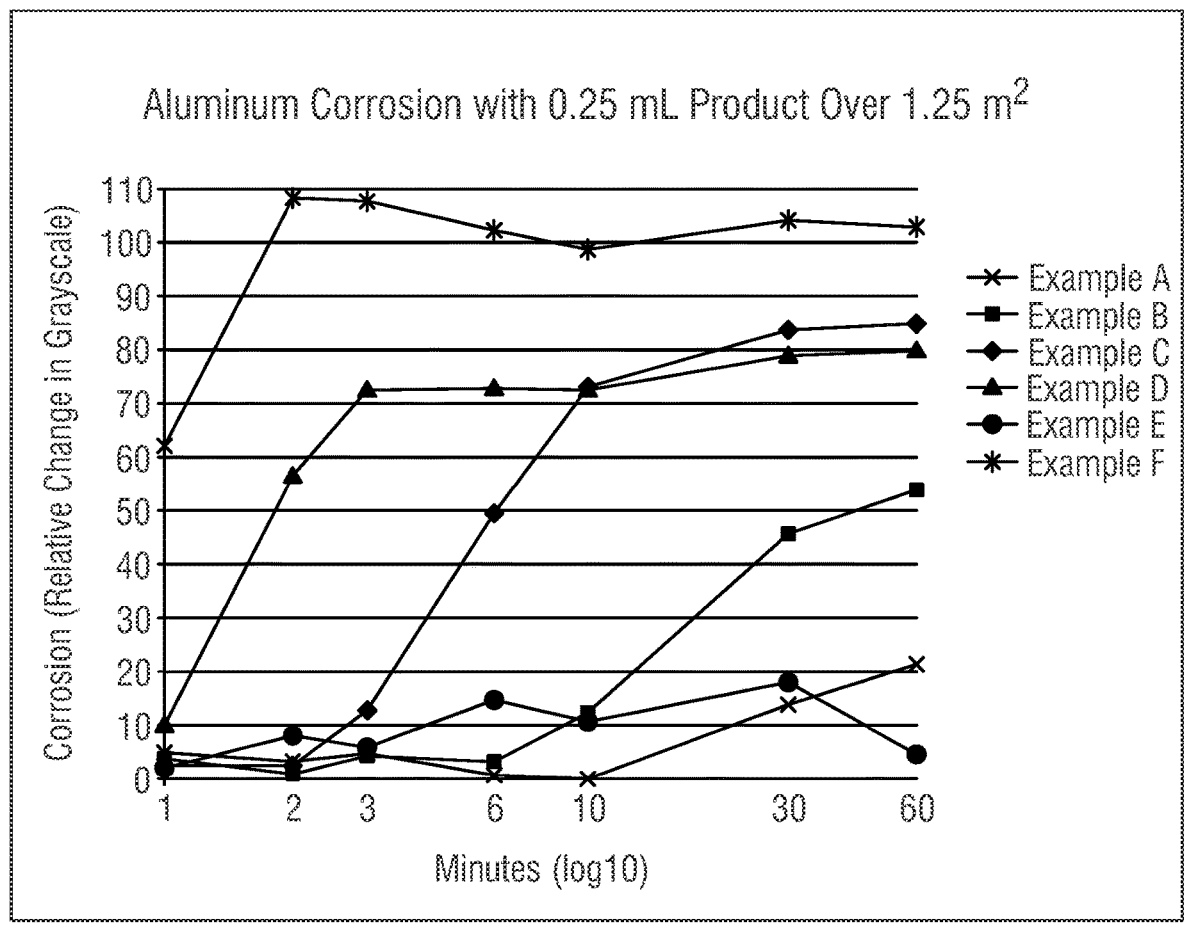

NON-CORROSIVE OVEN DEGREASER CONCENTRATE

CROSS REFERENCE TO RELATED APPLICATIONS

This is a Continuation Application of U.S. Ser. No. 17/816,575, filed Aug. 1, 2022, now U.S. Pat. No. 11,845,913, issued Dec. 19, 2023, which is a continuation application of Ser. No. 15/975,911 filed May 10, 2018, now U.S. Pat. No. 11,434,451, issued Sep. 6, 2022, which is a continuation application of Ser. No. 14/674,341 filed Mar. 31, 2015, now U.S. Pat. No. 9,994,798 issued Jun. 12, 2018, which is a continuation application of U.S. Ser. No. 13/459,448 filed Apr. 30, 2012, now U.S. Pat. No. 9,023,782 issued May 5, 2015, which application claims priority and is related to U.S. Provisional Application Ser. No. 61/488,254 filed on May 20, 2011, entitled Non-Corrosive Oven Degreaser Concentrate. The entire contents of this patent application are hereby expressly incorporated herein by reference including, without limitation, the specification, claims, and abstract, as well as any figures, tables, or drawings thereof.

FIELD OF THE INVENTION

The invention relates to a non-corrosive degreasing concentrate, cleaning system and methods for removing polymerized soils. In particular, concentrate compositions capable of removing polymerized grease as effectively or more superior to more corrosive and higher pH alkali metal hydroxide (i.e. caustic) based degreasers are disclosed.

BACKGROUND OF THE INVENTION

As a result of various health concerns and regulatory efforts there is a significant increase in the use of zero trans fats. This has resulted in significant cleaning problems for the food industry. For example, food processing equipment and/or environmental surfaces become contaminated with polymerized zero trans fat soils, which are very difficult to clean. Zero trans fats are less stable and more prone to degradation and polymerization than trans fats or saturated fats. Zero trans fats can be left on ambient or cold surfaces for an extended period of time and polymerize on these surfaces creating a difficult to clean soil. The longer a zero trans fat soil is left to polymerize on a surface, the more difficult it becomes to remove the soil from that surface. Mists of zero trans fats emanating from a hot zero trans fat source can also collect onto various surfaces and polymerize over time on these surfaces. The surfaces collecting these mists can be at cold, hot or ambient temperatures and create difficult to clean soils on all of these surfaces. Zero trans fats can be burnt onto cooking surfaces and then polymerize over time at an increased rate compared to a surface at a lower temperature and create soils that are more difficult to remove than similarly produced trans fat or saturated fat based soils. In addition, other food materials such as proteins, carbohydrates and other fats can be mixed in with the zero trans fats which, as they polymerize can also create complicated, harder to remove soils and residues than if the soils did not contain polymerized zero trans fat soils.

Those employing frying and baking operations are particularly affected by polymerized fat soils, because they use zero trans fats in high volumes. Also, these operations commonly route zero trans fats through tanks, lines, pumps and other processing equipment, which must be periodically cleaned but can in some operations go a significant amount of time between cleanings as required by the specific production process. In addition, other equipment, especially high, out of place piping, duct work (external as well as internal), roofs and ceilings, heating, cooling and air conditioning surfaces (HVAC), product freezers and coolers and many other surfaces in food manufacturing sites, can sometimes be left for days, weeks or months without thorough cleaning, collecting zero trans fat contamination and forming extremely hard to remove, polymerized zero trans fat soils. These soils can be so difficult to remove that in some cases, it would be less expensive to replace equipment than to pay for the intensive labor required to clean the surfaces properly. In order to permit food production operations to continue without major changes to equipment and food processing facility designs, a new method of cleaning is needed to permit extended food production time and to retain a safe, clean food processing environment.

Traditionally, highly alkaline and corrosive cleaning compositions are required to effectively remove zero trans fat soils. Commercially-available degreaser products rely upon the cleaning power of caustic or sodium hydroxide (see e.g. Easy Off™, Greasestrip Plus™) to go after polymerized grease soils. Often the pH of these cleaners is at least 12-13 or greater. In addition, the alkalinity of these cleaners is attributed to an alkali or alkaline earth metal hydroxide, for example, sodium hydroxide (NaOH) or caustic. Further description of exemplary high alkalinity products is provided in U.S. Patent Publication No. 2010/0317559, incorporated herein by reference in its entirety. Such products often contain 4-8% sodium hydroxide.

Many consumers do not wish to transport and/or handle highly alkaline and corrosive compositions as this presents a variety of safety concerns and hazards. This is a result of various requirements for personnel to use personal protective equipment (PPE) to reduce employee exposure to the hazardous or corrosive materials. PPE may include, for example, goggles, eye wash stations, masks and other protective equipment. Therefore, it would be desirable to provide a non-corrosive, lower pH cleaning composition that can disrupt the structure of polymerized zero trans fat soils to adequately remove this type of soil and thereby clean surfaces without requiring personnel to use PPE.

There are alternatives to using highly alkaline caustic degreaser products, including products containing monoethanolamine. However, these compositions are often limited as a result of regulations related to the VOC of the compositions. For example, certain products require less than 4% monoethanolamine (or total VOC, defined by having a vapor pressure less than 0.1 mm Hg at 20° C.) under state regulation and still require PPE as a result of the relatively high alkalinity. Additional alternatives include non-corrosive products using weaker alkalinity (pH around 11-12) cleaning agents which require more mechanical force to remove soils. For example, the cleaning products may include sodium carbonate or other non-hydroxide sources of alkalinity. Therefore, it would also be desirable according to the invention to provide cleaning compositions and methods to remove polymerized zero trans fat soils without requiring additional mechanical force.

The various degreaser compositions are also formulated as ready to use (RTU) compositions. Therefore, it is desirable to obtain a concentrated formulation according to the embodiments of the invention.

Accordingly, it is an objective of the claimed invention to develop a non-corrosive degreaser concentrate which produces a use solution with a pH below about 11.5.

A further object of the invention is to develop a non-corrosive degreaser concentrate providing equal cleaning efficacy as some alkali metal hydroxide (i.e. caustic) formulations, wherein the compositions of the present invention comprise less than 1% sodium hydroxide, preferably excluding sodium hydroxide.

A further object of the invention is methods of cleaning using a non-corrosive degreasing concentrate that does not require use of PPE.

BRIEF SUMMARY OF THE INVENTION

The non-corrosive degreaser of the present invention generally includes one or more alkaline sources, surfactant and solvent system to form a concentrated, non-corrosive degreaser composition. In various embodiments, the non-corrosive degreaser compositions may include one or more additives to modify the composition form and/or the application method. All components are optimized to provide a concentrated composition that may be diluted to a usable cleaning solution concentration. The use of the non-corrosive degreaser of the present invention has demonstrated efficacy equivalent to high alkaline, corrosive degreaser compositions.

In an aspect of the invention, methods for removing polymerized soils include applying to a soiled surface a non-corrosive composition having a use solution pH less than about 11.5 comprising: about 1 wt-% to about 50 wt-% alkaline source, wherein less than about 1 wt-% of said alkaline source is sodium hydroxide; about 1 wt-% to about 80 wt-% surfactant; and about 1 wt-% to about 90 wt-% solvent system.

In a further aspect of the invention, methods for removing polymerized soils include the step of first diluting a concentrated non-corrosive composition having a use solution pH less than about 11.5 before applying the diluted non-corrosive degreaser composition to a surface soiled with a polymerized fat soil, wherein personal protective equipment is not required.

In additional aspects of the invention, a non-corrosive degreaser composition for removing polymerized fat soil includes: about 1 wt-% to about 50 wt-% alkanol amine alkaline source, wherein less than about 1 wt-% of said alkaline source is sodium hydroxide; about 1 wt-% to about 80 wt-% surfactant; and about 1 wt-% to about 90 wt-% solvent system, wherein said composition generates a use solution having a pH less than about 11.5.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 1 shows the testing of aluminum corrosion described in Example 7 demonstrating the protective effects of degreasing concentrates with benzyl alcohol and TEA gluconate according to embodiments of the invention. Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The embodiments of this invention are not limited to particular concentrate compositions for non-corrosive oven degreasers which are less corrosive and provide a lower pH than conventional oven degreasers, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities refers to variation in the numerical quantity that can occur.

As used herein, the term "cleaning" refers to a method used to facilitate or aid in soil removal, bleaching, microbial population reduction, and any combination thereof.

The term "corrosive," as used herein, refers to cleaning products in a use solution having a pH great than about 11.5 without additional evidence of non-corrosive effects. However, as one skilled in the art will ascertain, a composition having a pH below 11.5 may be considered corrosive based upon testing (e.g. animal testing to confirm toxicology of a composition). Likewise, some compositions may be considered non-corrosive with a pH above 11.5 as a result of test data or consideration of buffering capacities (i.e. acid/alkali reserve). Classifications and testing for "corrosive" formulations are based upon corrosive or irritant effects of a substance and/or formulation. Further description of testing requirements (including either animal or human data) is available from various regulatory agencies at the time of the present invention, including for example European Commission, Enterprise and Industry Directorate-General, Position Paper of DG ENTR/G2 on the Classification and Labeling of Preparations with Extreme pH Values (11.5<pH<2) (2007).

As used herein, the term "substantially free" refers to compositions completely lacking the component (e.g. sodium hydroxide or any other corrosive or caustic alkaline earth metal hydroxide source) or having such a small amount of the component that the component does not affect the pH of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%. The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both, when using the substitute cleaning product or substitute cleaning system rather than a corrosive, greater pH cleaning composition to address a typical soiling condition on a typical substrate as described herein. This degree of cleanliness may, depending on the particular cleaning product and particular substrate, correspond to a general absence of visible soils, or to some lesser degree of cleanliness.

The terms "VOC" or "volatile organic compounds," as used herein, refer to organic compounds having significant vapor pressures that are capable of impacting the environment and human health. Although there are various recognized definitions for VOC, according to the present invention, consumer products such as the concentrated degreaser and use solution of the invention rely upon VOC definitions and guidelines regulating consumer products under the CARB regulations in California. Further description of these regulations available at the time of the invention is available at Title 17, California Code of Regulations, including the Proposed Amendments to the Definition of LVP-VOC and the Test Methods Sections of the Consumer Products Regulations (accessed 2011). According to these definitions there is an exemption for compounds with vapor pressures below 0.1 mm Hg at 20° C.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present invention may comprise, consist essentially of, or consist of the component and ingredients of the present invention as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Non-Corrosive Concentrated Degreaser Compositions

The present invention relates to non-corrosive compositions that effectively clean polymerized soils. The non-corrosive compositions have a lower pH than traditional degreasing compositions while providing substantially similar cleaning efficacy. In many embodiments the non-corrosive compositions provide superior cleaning efficacy over traditional, more corrosive and greater alkalinity compositions. In many embodiments of the present invention, the compositions are concentrated and suitable for dilution to be determined according to a user's specifications for cleaning soiled surfaces, wherein the soils may include, for example, polymerized zero trans fat soils. Generally, the non-corrosive composition includes: a suitable alkaline source, surfactant and a solvent and/or solvent system.

According to a preferred embodiment of the invention, the non-corrosive composition includes a monoethanolamine and/or 2-(2-aminoethoxy)ethanol alkaline source, a linear alkyl benzene sulfonated surfactant and a benzyl alcohol solvent and/or solvent system. While an understanding of the mechanism is not necessary to practice the present invention and while the present invention is not limited to any particular mechanism of action, it is contemplated that, in some embodiments, the benzyl alcohol provides a limited water soluble alcohol providing hydrophobicity that adds affinity towards greasy soils and acts as a plasticizer. The soils, upon contact with the non-corrosive degreaser according to the invention, swell and lose adhesion from the substrate, providing a unique cleaning approach in comparison to the use of caustic degreasers.

Beneficially, according to the embodiments of the present invention the pH of the non-corrosive degreaser use solution is less than about 11.5, less than about 11, less than about 10.5 or less than about 10. In other embodiments of the present invention the pH of the non-corrosive degreaser composition is from about 10-11.5. The compositions provide significant safety benefits as a result of the lower, non-corrosive pH range while providing substantially similar cleaning efficacy, and in many embodiments superior cleaning efficacy to traditional degreasing compositions.

According to a preferred embodiment, the compositions having a pH below about 11.5 do not require PPE, while unexpectedly providing the same or substantially similar degreasing efficacy for soil removal as compositions having pH above about 11.5 and/or compositions including caustic. In other aspects, the compositions provide superior degreasing efficacy. As a result of the concentrate formulation provided according to the invention, the non-aqueous concentrates do not provide a meaningful pH measurement and therefore pH measurements referenced herein relate to the use solution resulting from the concentrate according to the invention.

According to a further embodiment of the invention, the non-corrosive degreaser composition (concentrate and use solution) is a non-aluminum corrosive composition (i.e. not corrosive to aluminum). Preferably, the compositions result in magnitudes less aluminum loss in comparison to corrosive, sodium hydroxide based degreaser compositions. According to a further embodiment of the invention, the compositions of the invention result in no aluminum mass loss with application.

According to a further beneficial embodiment of the invention the non-corrosive degreaser composition is compatible with substrates having catalytic converters (e.g. surfaces treated with converters to eliminate smoke, such as in ovens). Catalytic converters are often a precious metal (e.g., platinum) and are treated or applied to substrate surfaces such as ovens. A further benefit of the present invention is that no residual inorganic substrates that would not be burned off in the degreasing process (i.e. sodium hydroxide) remain on the treated surface and/or foul the treated surface.

Alkalinity Sources

The non-corrosive concentrated degreaser compositions according to the invention include at least one alkalinity source. Examples of suitable alkaline sources for use in the compositions according to the invention include amines, alkanol amines, carbonates and silicates. For example, the source of alkalinity can include sodium silicate, sodium metasilicate, sodium orthosilicate, sodium phosphate, sodium polyphosphate, sodium borate, sodium carbonate, potassium silicate, potassium metasilicate, potassium orthosilicate, potassium phosphate, potassium polyphosphate, potassium borate, potassium carbonate, lithium silicate, lithium metasilicate, lithium orthosilicate, lithium phosphate, lithium polyphosphate, lithium borate, lithium carbonate, 2-(2-aminoethoxy)ethanol, monoethanolamine, diethanolamine, triethanolamine, mixed isopropanolamines, morpholine, n,n-dimethyl ethanolamine and combinations thereof.

Preferred embodiments of the invention include use of an alkanol amine, preferably monoethanolamine, diethanolamine, 2-amino-2-methyl-1-propanol, monoisopropanol amine, diisopropanolamine and/or 2-(2-Aminoethoxy)ethanol for the alkalinity source. According to an embodiment of the invention, the alkanol amine alkaline source is selected from the group consisting of monoethanolamine, diethanolamine, monoisopropanol amine, 2-(2-Aminoethoxy) ethanol and combinations thereof. Particularly preferred alkaline sources include monoethanolamine and/or 2-(2-Aminoethoxy)ethanol. It is believed that the monoethanolamine acts as a penetrant to the soiled surface. In addition, the monoethanolamine may have additional solvent activity in the non-corrosive degreaser compositions of the present invention. According to a further embodiment of the invention, the alkanol amines alkaline source (or combination of sources) is formulated to maximize the monoethanolamine content without exceeding the maximum permissible concentration for acceptable product VOC limits. As a result, the monoethanolamine concentration is maximized to provide enhanced cleaning potential of the non-corrosive product without exceeding the acceptable VOC limit. According to an embodiment of the invention, the alkanol amine diethylene glycol is combined with monoethanolamine to obtain a suitable VOC for the concentrate and use solution. According to one embodiment of the invention, the VOC of the concentrated composition does not exceed about 19.25%. According to a further embodiment of the invention, the VOC of the use solution does not exceed about 4%.

According to an embodiment of the invention, an upper unreacted alkanolamine concentration of about 7% can be achieved as a result of combining the 2-(2-aminoethoxy) ethanol to about 3% in use (about 12% concentrate).

In some embodiments, the non-corrosive degreaser concentrate compositions of the present invention comprise about 1 wt-% to about 50 wt-% of a source of alkalinity in the concentrated composition. In some embodiments, the source of alkalinity is present at about 5 wt-% to about 50 wt-% of the cleaning composition. In still yet other embodiments, the cleaning compositions comprise about 10 wt-% to about 50 wt-% of a source of alkalinity. It is to be understood that all values and ranges between these values and ranges are encompassed by the present invention as well as dilutions of the concentrate.

According to the invention the alkalinity source of the non-corrosive composition in the concentrate composition includes less than about 1 wt-% sodium hydroxide or other caustic alkaline earth metal hydroxide source. Preferably, according to the invention the alkalinity source of the non-corrosive composition in a use solution includes less than about 1 wt-% sodium hydroxide or other caustic alkaline earth metal hydroxide source.

According to a further embodiment of the invention, the alkalinity source of the non-corrosive composition comprises sodium hydroxide or any other corrosive or caustic alkaline earth metal hydroxide source in an amount that increases the pH of the use solution by less than or about 0.5 pH units. More preferably, the alkalinity source of the non-corrosive composition is substantially free of sodium hydroxide or any other corrosive or caustic alkaline earth metal hydroxide source. In a more preferred embodiment, the alkalinity source of the non-corrosive composition does not include sodium hydroxide or any other corrosive or caustic alkaline earth metal hydroxide source. Beneficially, the combination of monoethanolamine and/or 2-(2-Aminoethoxy)ethanol according to the invention acts as a non-corrosive soil penetrant and does not require the combined use with sodium hydroxide as seen in the art at the time of the invention.

Surfactant

The non-corrosive concentrated degreaser compositions according to the invention include at least one surfactant. The emulsifying properties of surfactants, according to the invention, can be used for both a concentrate that can be diluted to create a usable cleaning product (use dilution) and the use dilution itself. Beneficially, according to the invention the formulation provides a concentrate. This is distinct from the prior art which provides degreaser compositions in RTU formulations, which is often a result of the difficulty in adding thickeners (e.g. polymers, xanthum gums, clay particles, etc.) to a concentrate as a result of the elimination of any excess water from the concentrate formulation. Without being limited to a particular mechanism of the invention, the present invention utilizes the gel curve of suitable surfactants described herein such that when surfactants are emulsified in a concentrate formulation no additional water is required and thickening occurs upon dilution to a use solution by formation of rod like micelles or liquid crystalline structures.

The surfactant or mixture of surfactants can have foaming or defoaming characteristics in the composition as required by a desired cleaning method. For example, in certain applications long lasting foam may be required which can extend the cleaning time on a surface for the compositions. In certain applications it may be desirable to minimize foaming and a surfactant or surfactant system that provides reduced foaming can be used. In addition, it may be desirable to select a surfactant or surfactant system that exhibits foam that breaks down relatively quickly so that the composition can be recovered and reused with an acceptable amount of down time. The surfactant or surfactant system can be selected depending upon the particular polymerized soil that is to be removed.

Surfactants that can be used according to the invention include anionic, nonionic, cationic, and zwitterionic surfactants, which are commercially available from a number of sources. For a discussion of surfactants, see Kirk-Othmer, Encyclopedia of Chemical Technology, Third Edition, volume 8, pages 900-912. Additional description of suitable surfactants is set forth in U.S. Pat. No. 11,118,137 (filed Jun. 15, 2010), both references which are incorporated herein by reference in their entirety.

The surfactants described herein can be used alone or in combination. In particular, the nonionics and anionics can be used in combination. The semi-polar nonionic, cationic, amphoteric and zwitterionic surfactants can be employed in combination with nonionics or anionics. The above examples are merely specific illustrations of the numerous surfactants which can find application within the scope of this invention. It should be understood that the selection of particular surfactants or combinations of surfactants can be based on a number of factors including compatibility with the surface to be cleaned at the intended use concentration and the intended environmental conditions including temperature and pH.

In addition, the level and degree of foaming under the conditions of use and in subsequent recovery of the composition can be a factor for selecting particular surfactants and mixtures of surfactants. According to an embodiment of the invention, the foaming properties and viscosity of surfactants are suitable for uses having applications to vertical surfaces. According to a preferred embodiment of the invention, linear alkyl benzene sulfonate couples the benzyl alcohol of the concentrated degreaser compositions while providing suitable foaming properties.

In some embodiments, the concentrated non-corrosive degreaser compositions of the present invention comprise about 1 wt-% to about 80 wt-% of a surfactant in the concentrated composition. In some embodiments, the surfactant is present at about 5 wt-% to about 75 wt-% of the concentrated cleaning composition. In still yet other embodiments, the concentrated cleaning compositions comprise about 2% to about 25 wt-% of surfactant. It is to be understood that all values and ranges between these values and ranges are encompassed by the present invention.

Solvent System

The non-corrosive concentrated degreaser compositions according to the invention include at least one solvent or a solvent system. In various embodiments of the present invention, the non-corrosive composition may include at least one cleaning agent comprising a solvent or solvent system. The solvent or solvent system can be used as for enhancing the cleaning properties of the non-corrosive degreaser composition as well as to provide emulsifying properties of a given composition. For example, the solvent system according to the invention may keep hydrophilic and hydrophobic components of the specific composition from separating. The emulsifying properties can be used for both a concentrate that can be diluted to create a usable cleaning product (use solution) and the use dilution itself.

Representative solvents and solvent systems may include one or more different solvents including aromatic alcohols, alkanol amines, ether amines, esters and mixtures thereof. Representative solvents may include acetamidophenol, acetanilide, acetophenone, 2-acetyl-1-methylpyrrole, benzyl acetate, benzyl alcohol, methyl benzyl alcohol, alpha phenyl ethanol, benzyl benzoate, benzyloxyethanol, ethylene glycol phenyl ether (commercially available as "DOWANOL EPh" from Dow Chemical Co.), propylene glycol phenyl ether (commercially available as "DOWANOL PPh" from Dow Chemical Co.), amyl acetate, amyl alcohol, butanol, 3-butoxyethyl-2-propanol, butyl acetate, n-butyl propionate, cyclohexanone, diacetone alcohol, diethoxyethanol, diethylene glycol methyl ether, diisobutyl carbinol, diisobutyl ketone, dimethyl heptanol, dipropylene glycol tert-butyl ether, ethanol, ethyl acetate, 2-ethylhexanol, ethyl propionate, ethylene glycol methyl ether acetate, hexanol, isobutanol, isobutyl acetate, isobutyl heptyl ketone, isophorone, isopropanol, isopropyl acetate, methanol, methyl amyl alcohol, methyl n-amyl ketone, 2-methyl-1-butanol, methyl ethyl ketone, methyl isobutyl ketone, 1-pentanol, n-pentyl propionate, 1-propanol, n-propyl acetate, n-propyl propionate, propylene glycol ethyl ether, tripropylene glycol methyl ether (commercially available as DOWANOL TPM from Dow Chemical Co.), tripropylene glycol n-butyl ether (commercially available as DOWANOL TPNB from Dow Chemical Co.), diethylene glycol n-butyl ether acetate (commercially available as Butyl CARBITOL acetate from Dow Chemical Co.), diethylene glycol monobutyl ether (commercially available as Butyl CARBITOL from Dow Chemical Co.), ethylene glycol n-butyl ether acetate (commercially available as Butyl CELLOSOLVE acetate from Dow Chemical Co.), ethylene glycol monobutyl ether (commercially available as Butyl CELLOSOLVE from Dow Chemical Co.), dipropylene glycol monobutyl ether (commercially available as Butyl DIPROPASOL™ from Dow Chemical Co.), propylene glycol monobutyl ether (commercially available as Butyl PROPASOL from Dow Chemical Co.), ethyl 3-ethoxypropionate (commercially available as UCAR Ester EEP from Dow Chemical Co.), 2,2,4-Trimethyl-1,3-Pentanediol Monoisobutyrate (commercially available as UCAR Filmer IBT from Dow Chemical Co.), diethylene glycol monohexyl ether (commercially available as Hexyl CARBITOL from Dow Chemical Co.), ethylene glycol monohexyl ether (commercially available as Hexyl CELLOSOLVE from Dow Chemical Co.), diethylene glycol monomethyl ether (commercially available as Methyl CARBITOL from Dow Chemical Co.), diethylene glycol monoethyl ether (commercially available as CARBITOL from Dow Chemical Co.), ethylene glycol methyl ether acetate (commercially available as Methyl CELLOSOLVE acetate from Dow Chemical Co.), ethylene glycol monomethyl ether (commercially available as Methyl CELLOSOLVE from Dow Chemical Co.), dipropylene glycol monomethyl ether (commercially available as Methyl DIPROPASOL from Dow Chemical Co.), propylene glycol methyl ether acetate (commercially available as Methyl PROPASOL acetate from Dow Chemical Co.), propylene glycol monomethyl ether (commercially available as Methyl PROPASOL from Dow Chemical Co.), diethylene glycol monopropyl ether (commercially available as Propyl CARBITOL from Dow Chemical Co.), ethylene glycol monopropyl ether (commercially available as Propyl CELLOSOLVE from Dow Chemical Co.), dipropylene glycol monopropyl ether (commercially available as Propyl DIPROPASOL from Dow Chemical Co.) and propylene glycol monopropyl ether (commercially available as Propyl PROPASOL from Dow Chemical Co.). Representative dialkyl carbonates include dimethyl carbonate, diethyl carbonate, dipropyl carbonate, diisopropyl carbonate and dibutyl carbonate. Representative oils include benzaldehyde, pinenes (alphas, betas, etc.), terpineols, terpinenes, carvone, cinnamealdehyde, borneol and its esters, citrals, ionenes, jasmine oil, limonene, dipentene, linalool and its esters. Representative dibasic esters include dimethyl adipate, dimethyl succinate, dimethyl glutarate, dimethyl malonate, diethyl adipate, diethyl succinate, diethyl glutarate, dibutyl succinate, dibutyl glutarate and products available under the trade designations DBE, DBE-3, DBE-4, DBE-5, DBE-6, DBE-9, DBE-IB, and DBE-ME from DuPont Nylon. Representative phthalate esters include dibutyl phthalate, diethylhexyl phthalate and diethyl phthalate.

Preferred solvents for wetting of polymerized non-trans fat soils include benzyl alcohol, dibasic esters, essential oils, dialkyl carbonates, ethylene glycol monobutyl ether, diethylene glycol monobutyl ether, ethylene glycol phenyl ether, propylene glycol phenyl ether and mixtures thereof. Representative alkanol amines include 2-(2-aminoethoxy)ethanol, monoethanolamine, diethanolamine, triethanolamine, mixed isopropanolamines, morpholine, n,n-dimethyl ethanolamine and mixtures thereof. According to an embodiment of the invention, the solvent system includes aromatic alcohols (e.g., benzyl alcohols, phenyl alcohols). Preferably the aromatic alcohol solvent system is benzyl alcohol. According to a further embodiment, the solvent system may include benzyl acetate, benzyl alcohol, methyl benzyl alcohol, alpha phenyl ethanol, benzyl benzoate, benzyloxyethanol and/or the like. Additional description of solvent systems that may be included in the compositions according to the invention are disclosed in U.S. Patent Publication No. 2010/0317559, incorporated herein by reference in its entirety.

According to a preferred embodiment of the invention, the solvent is benzyl alcohol. The solvent may further include solvents in similar limited water solubility range as benzyl alcohol, including for example benzyloxyethanol and/or benzyloxypropanol.

In some embodiments, the concentrated non-corrosive degreaser compositions of the present invention comprise about 1 wt-% to about 90 wt-% of a solvent system in the concentrated composition. In some embodiments, the solvent system is present at about 5 wt-% to about 75 wt-% of the cleaning composition. In still yet other embodiments, the cleaning compositions comprise about 30 wt-% to about 60 wt-% of a solvent system. It is to be understood that all values and ranges between these values and ranges are encompassed by the present invention.

Use Solutions

According to an embodiment of the invention a use dilution of the concentrate composition can range from about 1:1 to about 1:10. Dilution ranges in between are also suitable according to the present invention. More preferably, a use dilution of about 1:3 to about 1:6 is obtained from the concentrate composition. Preferably, a use dilution of the concentrate composition contains less than about 1 wt-% sodium hydroxide or other caustic alkaline earth metal hydroxide source.

As one skilled in the art will ascertain as a result of the disclosure of the present invention, a use solution can be generated according to the particular needs of a user and its application. For example, the concentrated non-corrosive degreaser compositions according to the invention may be diluted to a use solution that has a particular VOC limit and/or ethanolamine concentration. According to one embodiment of the invention, concentrated non-corrosive degreaser composition may be diluted to about 25% ethanolamine wt/wt wherein the upper limit of a non-corrosive use solution is obtained and may or may not require use of PPE. Alternatively, according to one embodiment of the invention, the concentrated non-corrosive degreaser composition may be diluted to about 14% ethanolamine wt/wt wherein no PPE is required.

Additives

The non-corrosive concentrated degreaser compositions according to the invention may optionally include one or more additive(s) to modify the composition form and/or application method. According to an embodiment of the invention, the non-corrosive concentrated composition may include from about 0.01 wt-% to about 10 wt-% of one or more additives.

Suitable additives according to the invention may include, for example, dyes (product safety/identification), fragrances, corrosion inhibitors and/or enzymes. According to a further embodiment of the invention, various thickeners would be useful according to the invention. Suitable thickeners may include, for example, gums (i.e., xanthan, carrageenan, etc.), polymers (i.e., polyacrylates and similar modified polymers), inorganic particles (i.e., clay silicates such as Laponite™), and surfactants for the purpose of providing viscosity. Various additional additives suitable for use according to the invention are disclosed in U.S. Pat. No. 6,916,773 and U.S. Patent Publication Nos. 2010/0317 and 2010/0317559, which are incorporated herein by reference in their entirety.

Methods of Use

The non-corrosive degreaser compositions of the invention may be used in a variety of methods for cleaning soiled surfaces. In one embodiment, the present invention is a method for cleaning polymerized fat soils. The cleaning methods generally use the non-corrosive degreaser compositions described above. In certain embodiments, an environmental cleaning method is provided. In other embodiments, a clean in place (CIP) method is provided. According to further embodiments of the invention, the non-corrosive degreaser compositions can be used in any other methods seeking to remove polymerized soils without requiring the use of corrosive formulations, such as removing polymerized or cross-linked films from floors and other finishes.

Beneficially the non-corrosive degreaser compositions do not require use of personal protective equipment as a result of the pH below about 11.5. In addition, the non-corrosive degreaser compositions achieve degreasing action within approximately 5 seconds to a few minutes of contact to a soiled surface. According a preferred embodiment of the invention, application of the non-corrosive degreaser compositions result in soil removal within about seconds without requiring substantial mechanical action or excessive temperatures. The methods of the present invention result in cleaning efficacy at least the same as that obtained with the use of corrosive, highly alkaline compositions of the prior art. According to the invention, the methods of use of the non-corrosive degreaser compositions result in substantially similar soil removal efficacy as traditional corrosive compositions having pH greater than about 11.5. In additional aspects, the methods of use of the non-corrosive degreaser compositions result in superior soil removal in comparison to traditional corrosive compositions having pH greater than about 11.5.

Exemplary industries in which the present methods can be used include, but are not limited to: food service industry; food and beverage industry; consumer degreasing applications; oil processing industry; industrial agriculture and ethanol processing; and the pharmaceutical manufacturing industry. Suitable used for the compositions and methods of the invention may include, for example, oven cleaner, including microwave ovens, general degreaser, fryer degreaser, smokehouse cleaner, floor cleaner, exhaust hood cleaner, drain cleaner, floor finish remover, floor cleaner, fryer cleaner, pot and pan cleaner, carpet spotter, pharmaceutical and cosmetics cleaner, instrument cleaner, tar remover, and the like.

The present methods can also be used to remove soils other than polymerized soils. Such other soils include, but are not limited to, starch, cellulosic fiber, protein, simple carbohydrates and combinations of any of these soil types with mineral complexes. Examples of specific food soils that are effectively removed using the present methods include, but are not limited to, soils generated in the manufacture and processing meat, poultry, vegetables and fruit, bakery goods, soft drinks, brewing and fermentation residues, soils generated in sugar beet and cane processing and processed foods containing these ingredients and associated ingredients such as juices, sauces and condiments (e.g., fruit juices, ketchup, tomato sauce, barbeque sauce). These soils can develop on environmental surfaces such as walls and floors, freezers and cooling systems, heat exchange equipment surfaces, conveyor surfaces and on other surfaces during the manufacturing and packaging process.

CIP Cleaning Methods

Methods for CIP cleaning can be used to clean a wide variety of processing equipment, including, but not limited to fryers, various freezer or refrigerated systems, evaporators, heat exchangers (including tube-in-tube exchangers, direct steam injection, and plate-in-frame exchangers), heating coils (including steam, flame or heat transfer fluid heated) re-crystallizers, pan crystallizers, spray dryers, drum dryers, and tanks. In addition, CIP cleaning methods can be used to clean environmental areas including, but not limited to entire areas containing food processing equipment and associated walls, ceilings, floors in addition to duct work (external and internal) as well as other air handling systems.

In one embodiment, a CIP method is provided. This method is adapted for removing polymerized soils from internal components of tanks, lines, pumps and other process equipment used for processing typically liquid product streams, including zero trans fat streams in addition to external surfaces of such equipment that can be cleaned in an automated fashion in an enclosed area. This method generally involves passing the non-corrosive degreaser composition in a use solution through a processing system without dismantling any system components and then resuming normal processing. The non-corrosive degreaser compositions can be used in any known CIP method. In some cases, the method includes passing the following liquids through a processing system: a first rinse, a cleaning cycle using the high alkaline composition herein described; a second rinse and, possibly, a neutralizing or sanitizing rinse and, possibly, a final rinse. The first rinse can include another cleaning composition or hot or cold water. The second rinse often includes hot or cold water and is used to remove the non-corrosive degreaser composition and residual soil. An additional rinse may be used to neutralize or sanitize the equipment being cleaned which may or may not require a final rinse to remove residual neutralizing or final rinse and is often skipped in order to prevent contamination of the equipment with bacteria following the cleaning In certain cases, the CIP method includes a step of heating the non-corrosive degreaser composition in a use solution to a temperature of about 100° F. or above. In various embodiments of the present invention, the method includes a step of heating the non-corrosive degreaser composition in a use solution to a temperature of about 100° F. to about 200° F., from about 140° F. to about 180° F. The inventors have discovered the non-corrosive degreaser compositions show improved cleaning characteristics of difficult polymerized soils.

Exemplary industries in which the present methods can be used include, but are not limited to: the food and beverage industry; oil processing industry; industrial agriculture and ethanol processing; and the pharmaceutical manufacturing industry.

Environmental Cleaning Methods

In another embodiment, an environmental cleaning method is provided. This method is adapted for removing polymerized soils from environmental surfaces, which include, but are not limited to walls, floors, dishes, flatware, pots and pans, ovens and fryers. This method generally involves contacting an environmental surface with the non-corrosive degreaser composition. In certain cases, the environmental method includes a step of heating the non-corrosive degreaser compositions to a temperature of about 40° F. or above, 40° F. to about 130° F. In other cases the environmental methods provide for soil removal from surfaces at an ambient or room temperature, e.g., about 50° F. to about 100° F. In other cases, methods provide for soil removal from surfaces at colder temperature, e.g., about 25° F. to about 50° F. In other cases, the methods may require applying to environmental surfaces that range in temperature from 0° F. to about 200° F. which may exist in close proximity within a facility to be cleaned (for example freezer coils and hot fat piping respectively).

Again, in general, the non-corrosive degreaser composition show increased beneficial cleaning characteristics when applied to surfaces contaminated with difficult polymerized soils. The compositions do not need to be heated to remove polymerized soils (soils that have a lower level of polymerization due to less time to polymerize or under lower temperature conditions during polymerization). In some embodiments the environmental method includes contacting an environmental surface with the non-corrosive degreaser compositions for a sufficient amount of time such that the composition penetrates into the soil to be removed.

The length of time required for soil penetration will depend on the thickness of the soil as well as the relative polymerization level of the soil. In such cases, it is preferable that the non-corrosive degreaser composition includes a high foaming surfactant system or a thickening system so that the composition does not dry out and remains hydrated on the surface for an extended period of time. All publications and patent applications in this specification are indicative of the level of ordinary skill in the art to which this invention pertains. All publications and patent applications are herein incorporated by reference to the same extent as if each individual publication or patent application was specifically and individually indicated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Preparation of polymerized Corn Oil Panels. Corn oil soils were prepared onto 3×5 inch stainless steel panels by lightly coating corn oil using a 2 inch polyurethane brush. The panels were coated to ensure no streaks of bare steel remained and any excess oil was removed using only the weight of the brush. Panels were then placed on an aluminum tray and cooked in a 375° F. oven for approximately 20 minutes until the polymerized oil was no longer tacky and exhibited a light amber color. After approximately 10 minutes of cooking the oil begins to polymerize and thicken and smoke evolves from the oil. The pan should be rotated to ensure panels are evenly heated in oven. The panels are then allowed to cool overnight before testing with cleaning/degreasing formulations. There are various regulations control standards for non-corrosive products.

According to an initial embodiment of the invention, a targeted formulation contains about 16% benzyl alcohol and 7% monoethanolamine while providing a non-corrosive rating for eyes. The formulation was tested according to application and soil removal from the corn oil panels described above. The formulation achieved complete removal of soil (12480-35) within 3 minutes of contact. Observed soil removal appeared to result from the swelling of soil from panel surface causing loosened adhesion.

Example 2

Additional formulations eliminating sodium from the degreaser formulation were prepared and analyzed in accordance with the soil removal from the corn oil panels described in Example 1. The monoethanolamine was used to replace the sodium. Improved performance and the reduction of potential residues on catalytic converters for convection microwave ovens and other applications were tested. A formulation of benzyl alcohol, monoethanolamine, linear alkyl benzene sulfonate and water was tested (forming a clear solution). The formulation achieved complete removal of soil (12480-35) within 3 minutes of contact.

Example 3

Additional formulations were analyzed to determine the minimum amount of linear alkyl benzene sulfonate required in a degreaser concentrate to couple or solubilize the benzyl alcohol. The impact of the formulation modifications were also tested against use solution VOC levels of the formulation. A formulation of benzyl alcohol, monoethanolamine, 2-(2-Aminoethoxy)ethanol, linear alkyl benzene sulfonate and water was tested and achieved a clear solution.

Example 4

A use solution of a commercially-available corrosive degreaser (Greasestrip PLUS (7% sodium hydroxide), Ecolab Inc., St. Paul, MN) was compared to a non-corrosive degreaser (Greasecutter NC (4% monoethanolamine), Ecolab Inc., St. Paul, MN). Three drops of each of the two degreaser formulations were dispensed via pipette to a prepared corn oil panel (as described in Example 1). After approximately 12 minutes of contact, the area of corn oil soil treated with the Greasestrip PLUS begin to disintegrate. At 15 minutes the panels were rinsed.

The Greasestrip PLUS treated area of the panel was completely clean, while the Greasecutter NC was virtually unaffected (slight discoloration and slight tacking feeling). This demonstrates that a solution with 4% MEA alone as the active components can exhibit a dramatically lower performance on some soils than traditional alkali hydroxide based products.

Example 5

An evaluation of the pH of use solutions was also conducted. The effect of benzyl alcohol on pH of use solutions was studied. A formulation according to the invention with varying amounts of benzyl alcohol with Linear Alkyl Benzene Sulfonate, 2-(2-Aminoethoxy)ethanol and Monoethanolamine was tested. The formulation was stirred for 30 minutes until the Linear Alkyl Benzene Sulfonate neutralized and dissolved into solution. Benzyl Alcohol was added to the solution and pH measured as shown in Table 1.

TABLE 1

| Benzyl Alcohol | Formulation pH |
|---|---|
| 0 g (0%) | 10.80 |
| 4 g (1%) | 10.73 |
| 4 g (2%) | 10.68 |
| 8 g (4%) | 10.64 |
| 8 g (6%) | 10.53 |
| 12 g (9%) | 10.60 |
| 8 g (11%) | 10.61 |
| 9.25 g (13.31%) | 10.63 |

The pH initially decreased to a minimum of approximately 10.53 at approximately 6% benzyl alcohol. As the concentration of benzyl alcohol increased beyond this point, the pH began increasing. Although not intended to be limited according to a particular theory of mechanism of action, the ethanolamines may be partially solubilized or coordinated into the Linear Alkyl Benzene Sulfonate and benzyl alcohol microemulsion, which may reduce acceptance of protons.

Example 6

Effect on efficacy of polymerized oil removal from aluminum. The aluminum safety of the formulations of the invention was studied. The efficacy of the non-corrosive degreaser according to the invention was compared to Grease Cutter Plus (Ecolab Inc., St. Paul, MN) when applied to aluminum trays with corn oil soils (soiling conducted in accordance with Example 1 materials and methods).

Hydrogen gas immediately forms as an indication of aluminum corrosion from the reaction of NaOH with aluminum, and after 7 minutes of exposure the surface is visibly dulled, whereas the non-corrosive degreaser according to the invention imparted no visible signs of corrosion.

Example 7

The effect of degreasing compositions on the corrosion of aluminum surfaces was evaluated. The relative change in grayscale (i.e. corrosion) of aluminum trays with corn oil soils (soiling conducted in accordance with Example 1 materials and methods) is shown in FIG. 1 for the various example products evaluated in Table 2.

TABLE 2

| | EX-A | EX-B | EX-C | EX-D | EX-E | EX-F | EX-G |
|---|---|---|---|---|---|---|---|
| BENZYL ALCOHOL | 8.6 | 9.0 | | | | | 13.1 |
| Diethylene Glycol monobutyl ether | | | | | | 1.5 | |
| ETHANOLAMINE | 4.0 | 4.0 | 4.0 | 4.0 | | 0.9 | 4.0 |
| sodium hydroxide | | | | | 0.2 | 4.0 | |
| Sodium Carbonate | | | | | 6.7 | | |

TABLE 2-continued

| | EX-A | EX-B | EX-C | EX-D | EX-E | EX-F | EX-G |
|---|---|---|---|---|---|---|---|
| Ethanolamine dodecylbenzene sulfonate | 3.2 | 3.2 | 3.2 | | | | 4.7 |
| 2-(2-aminoethoxy)ethanol | 0.7 | 0.9 | 0.7 | | | | 2.3 |
| acetic acid, (ethylenedinitrilo)tetra-, tetrasodium salt | | | | | 5.3 | | |
| potassium phosphate | | | | 0.8 | | | |
| acetic acid, (ethylenedinitrilo)tetra-, tetrasodium salt | | | | 0.5 | | | |
| silicic acid, potassium salt | | | | | 0.4 | | |
| triethanolamine gluconate (TEA gluconate) | 0.4 | | | | | | 0.4 |
| Sodium Gluconate | | | | | | 0.6 | |
| alcohols, c10-14, ethoxylated | | | | | 4.0 | | |
| glycolic acid, monosodium salt | | | | | 0.4 | | |
| Sodium Lauryl Ether Sulfate | | | | 0.3 | | | |
| amines, coco alkyldimethyl, n-oxides | | | | 0.2 | | | |
| 1-propanaminium, 3-amino-n-(carboxymethyl)-n,n-dimethyl-, n-coco acyl derivs., inner salts | | | | 0.6 | | | |
| Alkyl polyglycoside | | | | | | 1.2 | |
| xylenesulfonic acid, sodium salt | | | | | 5.9 | | |
| xanthan gum | | | | 0.2 | | 0.3 | |
| Water (5 grains per gallon hardness in Example A otherwise 0 gpg for RTUs) | 83.1 | 82.9 | 92.1 | 93.6 | 77.2 | 91.5 | 75.5 |
| pH | 10.62 | 10.66 | 10.91 | 12.02 | 12.17 | 13.60* | 10.61 |
| Time to remove baked on corn oil at 72° F. (mins:secs) | 3:47 | 3:49 | >45:00 | >45:00 | >45:00 | 2:35 | 2:15 |
| Time to remove baked on corn oil at 120° F. (mins:secs) | 0:50 | 0:53 | >25:00 | >25:00 | >25:00 | 1:04 | 0:45 |

In Example F the pH reading exceeded the range of the electrode where a sodium error can occur. The pH was likely closer to 13.88.

The Example formulations demonstrate the beneficial use of benzyl alcohol and TEA gluconate in the non-corrosive degreaser compositions and the contribution to aluminum protection. In addition, the orders of magnitude improvement over the conventional caustic degreasers (i.e. Example 6) are shown in both Table 3 and FIG. 1. The compositions according to the invention provide at least equivalent and preferably superior degreasing performance.

TABLE 3

| Minutes | EX-C | EX-B | EX-D | EX-A | EX-F | EX-E |
|---|---|---|---|---|---|---|
| 1 | 2.9 | 3.9 | 10.3 | 5.1 | 62.3 | 2.4 |
| 2 | 2.8 | 1.0 | 56.9 | 3.3 | 108.3 | 8.2 |
| 3 | 13.0 | 4.4 | 72.5 | 4.9 | 107.8 | 6.1 |
| 6 | 49.3 | 3.3 | 73.0 | 0.8 | 102.3 | 14.9 |
| 10 | 73.1 | 12.3 | 72.5 | 0.0 | 98.9 | 10.7 |
| 30 | 83.8 | 45.9 | 79.0 | 14.1 | 104.1 | 18.4 |

Example 8

Additional corrosion tests were analyzed utilizing Examples A and D formulations from Example 7. Tables 4 and 5 show the beginning and end corrosion measurements for aluminum samples immersed in the degreasing compositions.

TABLE 4

Example A 7075 Aluminum

| Sample | Beginning | End |
|---|---|---|
| 1 | 5715.6 | 5687.7 |
| 2 | 5748.8 | 5720.9 |

MPY (mils/yr) Corrosion 229.07
MPY (mils/yr) Corrosion 229.07

TABLE 5

Example D 7075 Aluminum

| Sample | Beginning | End |
|---|---|---|
| 1 | 5764.6 | 5527.4 |
| 2 | 5755.6 | 5516.8 |

MPY (mils/yr) Corrosion 1947.49
MPY (mils/yr) Corrosion 1960.63

Tables 4 and 5 show that Example A is significantly less corrosive to aluminum, and meets DOT guidelines for classification as a non-corrosive material.

The DOT definition of corrosive includes products requiring a corrosive label with corrosion rates exceeding 250 mils per year (MPY) on either steel or aluminum (See 49 CFR 173.137; NACE Standard TM0169-76; ASSTM G31-72 (reapproved 2004)). The MPY calculation for corrosion is (((weight loss in mg)×(534))/(panel area×time in hours× metal density)).

Example 9

The micro efficacy of Examples A and D formulations from Example 7 was evaluated to assess whether the less corrosive Example A formulation could perform as an effective biocide. The objective of the analysis was to determine the food contact surface sanitizing efficacy after a 30 second exposure time and the non-food contact surface sanitizing efficacy after a 5 minute exposure time at ambient temperature of Example A and Example D formulations against Staphylococcus aureus (ATCC 6538) and Escherichia coli (ATCC 11229).

Food contact surface sanitizing efficacy was evaluated using Staphylococcus aureus (ATCC 6538) with average inoculum numbers of $1.4 \times 10^8$ CFU/mL and Escherichia coli (ATCC 11229) with average inoculum numbers of $1.1 \times 10^8$ CFU/mL. Micro efficacy against Staphylococcus aureus is shown in Table 6 and against Escherichia coli is shown in Table 7.

TABLE 6

| Test Substance | Survivors (CFU/mL) | Average Survivors (CFU/mL) | Log Reduction | Percent Reduction |
|---|---|---|---|---|
| Example A | <10, <10 | <10 | 7.14 | >99.99999% |
| Example D | $6.6 \times 10^7$, $6.9 \times 10^7$ | $6.75 \times 10^7$ | 0.3 | 51.8% |

TABLE 7

| Test Substance | Survivors (CFU/mL) | Average Survivors (CFU/mL) | Log Reduction | Percent Reduction |
|---|---|---|---|---|
| Example A | <10, <10 | <10 | 7.0 | 99.99999% |
| Example D | <10, <10 | <10 | 7.0 | 99.99999% |

Non-food contact surface sanitizing efficacy was evaluated using Staphylococcus aureus (ATCC 6538) and Escherichia coli (ATCC 11229) with average inoculum numbers shown in Table 8.

TABLE 8

| Organism | Control Square #1 | Control Square #2 | Control Square #3 | Average |
|---|---|---|---|---|
| S. aureus | $2.2 \times 10^7$ | $2.4 \times 10^7$ | $2.5 \times 10^7$ | $2.3 \times 10^7$ |
| E. coli | $2.5 \times 10^3$ | $9 \times 10^4$ | $2.5 \times 10^3$ | $3.2 \times 10^4$ |

The micro efficacy against Staphylococcus aureus is shown in Table 9 and against Escherichia coli is shown in Table 10.

TABLE 9

| Test Substance | Average Survivors (CFU/mL) | Log Reduction | Percent Reduction |
|---|---|---|---|
| Example A | $<2.5 \times 10^1$ | >6.0 | >99.9999% |
| Example D | No Reduction | No Reduction | No Reduction |

TABLE 10

| Test Substance | Average Survivors (CFU/mL) | Log Reduction | Percent Reduction |
|---|---|---|---|
| Example A | $<2.5 \times 10^1$ | >2.52 | 99.92% |
| Example D | $<2.5 \times 10^1$ | >2.52 | 99.92% |

Food contact surface sanitizer efficacy. The non-corrosive degreaser formulation A achieved a >99.999 percent reduction with a 30 second exposure time at 25° C. against both Staphylococcus aureus ATCC 6538 and Escherichia coli ATCC 11229, demonstrating the efficacy for use as a food contact surface sanitizer. Degreaser formulation D achieved a >99.999 percent reduction with a 30 second exposure time at 25° C. against Escherichia coli ATCC 11229 only. Only a 51.8 percent reduction with a 30 second exposure at 25° C. was achieved against Staphylococcus aureus ATCC 6538.

Non-food contact surface sanitizer efficacy. The non-corrosive degreaser formulation A achieved a >99.9 percent reduction with a 5 minute exposure time at ambient temperature against both Staphylococcus aureus ATCC 6538 and Escherichia coli ATCC 11229. However, the corrosive formulation D achieved a >99.9 percent reduction with a 5 minute exposure time at ambient temperature against Escherichia coli ATCC 11229 and had no reduction with a 5 minute exposure time at ambient temperature against Staphylococcus aureus ATCC 6538.

The inventions being thus described, it will be obvious that the same may be varied in many ways. Such variations are not to be regarded as a departure from the spirit and scope of the inventions and all such modifications are intended to be included within the scope of the following claims.

The invention claimed is:

1. A non-corrosive concentrated degreaser composition for removing polymerized fat soil consisting of:
   (i) 5 wt-% to about 50 wt-% of triethanolamine, optionally monoethanolamine, diethanolamine, or a combination thereof;
   (ii) about 1 wt-% to about 80 wt-% of at least one surfactant;
   (iii) about 1 wt-% to 20 wt-% of benzyl alcohol;
   (iv) optionally, about 0.01 wt-% to about 10 wt-% of one or more additives selected from the group consisting of a dye, fragrance, corrosion inhibitor, enzyme, thickener, polymer, clay silicate, chelating agent; and
   (v) the remainder is water;
   wherein the composition is emulsified to form a use solution or diluted to a use solution having a pH of 11.5 or less.

2. The composition of claim 1, wherein the at least one surfactant is linear alkyl benzene sulfonate.

3. The composition of claim 1, wherein the composition is used to remove a polymerized fat soil from a soiled surface.

4. The composition of claim 1, wherein the composition is applied to the soiled surface to be cleaned for an amount of time from about one second to about 24 hours depending on the level of polymerization in order to substantially penetrate a polymerized fat soil.

5. The composition of claim 4, wherein the penetration occurs without requiring mechanical force.

6. The composition of claim 1, wherein the polymerized fat soil comprises a polymerized zero trans fat soil, a polymerized grease soil, or a combination thereof.

7. The composition of claim 1, wherein the composition is non-corrosive to aluminum.

8. The composition of claim 1, wherein the composition is compatible with catalytic converter substrate surfaces.

9. A method for removing a polymerized fat soil comprising: contacting the composition of claim 1 with a surface soiled with a polymerized fat soil.

10. The method of claim 9, wherein the soiled surface comprises processing equipment.

11. The method of claim 9, wherein the soiled surface is an environmental surface.

12. The method of claim 9, wherein the soiled surface is a wall, floor, dish, flatware, pot, pan, oven, fryer, or a combination thereof.

13. The method of claim 9, wherein the composition is applied to the soiled surface for between about one second to about 24 hours.

14. The method of claim 9, further comprising a step of forming a use solution.

15. The method of claim 14, wherein the use solution is formed by emulsifying the composition or diluting the composition.

* * * * *